United States Patent [19]
Russell et al.

[11] Patent Number: 6,114,985
[45] Date of Patent: *Sep. 5, 2000

[54] AUTOMOTIVE FORWARD LOOKING SENSOR TEST STATION

[75] Inventors: Mark E. Russell, Westford; Clifford A. Drubin, Groton, both of Mass.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/975,887

[22] Filed: Nov. 21, 1997

[51] Int. Cl.$^7$ .......................................... G01S 7/40
[52] U.S. Cl. ........................ 342/169; 342/165; 342/173
[58] Field of Search .................... 342/165, 173, 342/174, 169, 170; 434/2

[56] References Cited

U.S. PATENT DOCUMENTS

| | | |
|---|---|---|
| 4,106,345 | 8/1978 | Saunders et al. |
| 4,467,327 | 8/1984 | Drake et al. |
| 4,560,987 | 12/1985 | Dochow et al. .................. 342/171 |
| 4,621,265 | 11/1986 | Buse et al. |
| 4,864,315 | 9/1989 | Mohuchy .......................... 342/173 |
| 5,117,230 | 5/1992 | Wedel, Jr. |

FOREIGN PATENT DOCUMENTS 2709183  2/1995  France.

OTHER PUBLICATIONS

Search report from the EPO in connection with PCT application PCT/US98/24457, dated Mar. 16, 1999, 7 pages.
Automotive Anticollision Radar, Yukio Takimoto and Minoru Kotaki, Applied Microwave Fall 1992, pp. 70, 72, 74–78, 80–82.

*Primary Examiner*—Ian J. Lobo
*Attorney, Agent, or Firm*—Daly, Crowley, & Mofford, LLP

[57] ABSTRACT

A test station for testing the performance of an automotive Forward Looking Sensor (FLS) in detecting one or more targets in a predetermined scene within the field of view of the FLS. The test station includes a chamber having a first end at which the FLS is disposed and a second end at which a Transmit/Receive Test (TRT) system is disposed. The TRT system includes an antenna array responsive to an RF signal transmitted by the FLS and a Transmit/Receive (TR) processor for processing the received signal in order to simulate the predetermined scene and for transmitting the processed signal back to the FLS. The TR processor includes at least one Transmit/Receive Radio Frequency (TR RF) processor module for processing the received RF signal by selectively shifting the frequency and/or adjusting the amplitude of the signal.

31 Claims, 13 Drawing Sheets

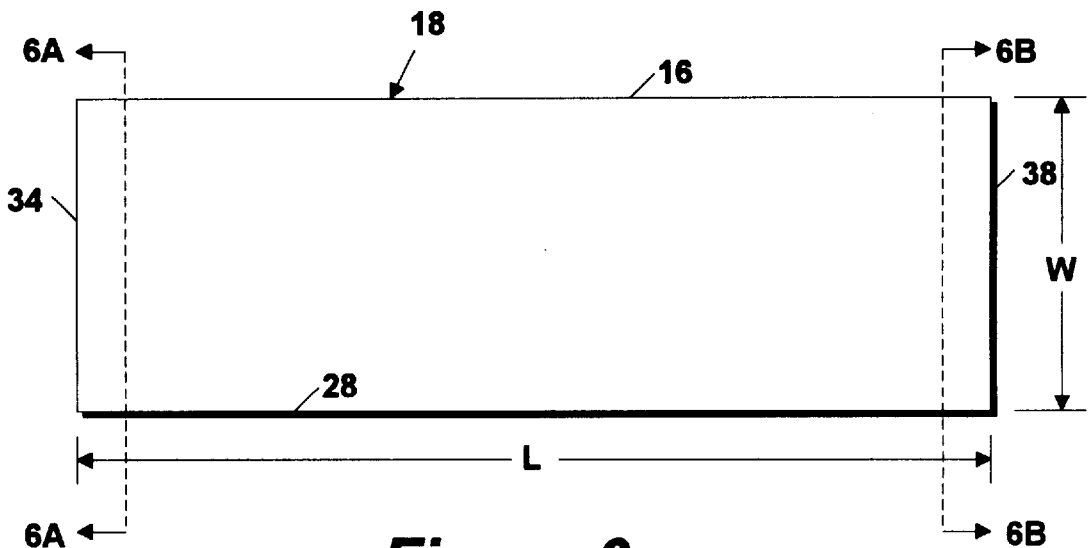
Figure 6
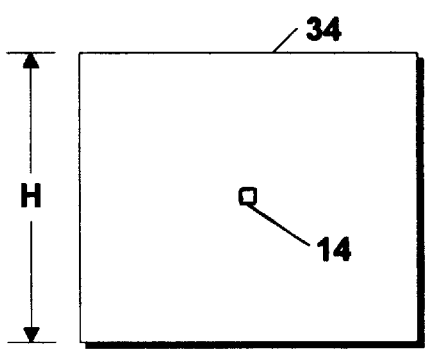 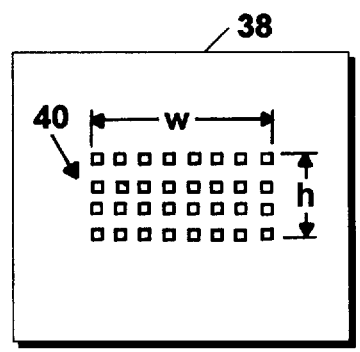
Figure 6B       Figure 6B

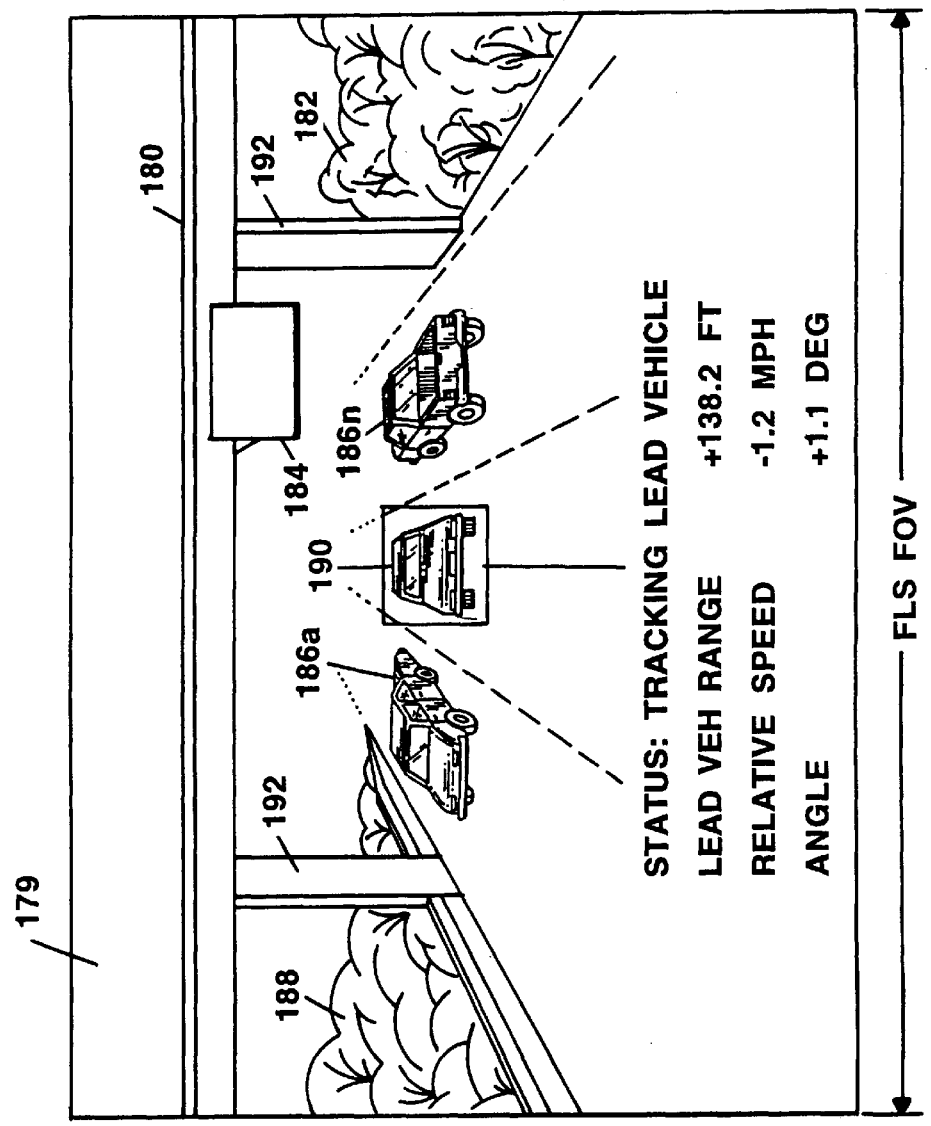
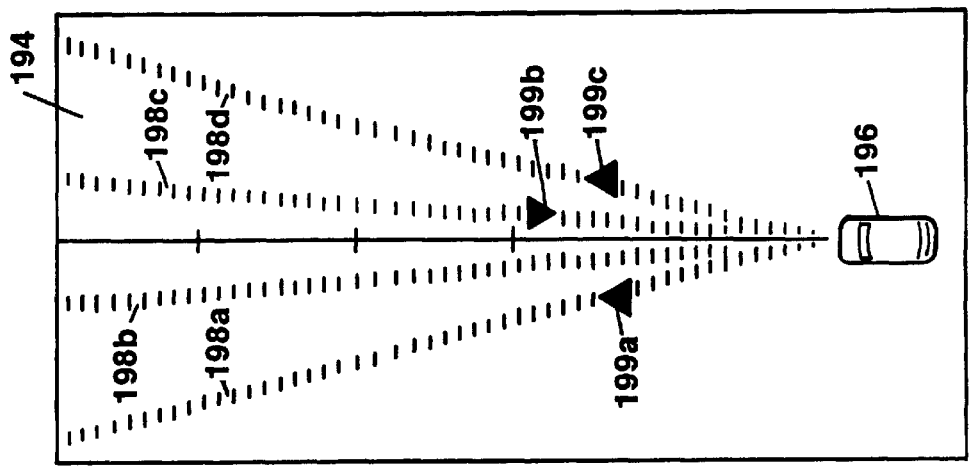
*Figure 10*

AUTOMOTIVE FORWARD LOOKING SENSOR TEST STATION

CROSS-REFERENCE TO RELATED APPLICATIONS

Not applicable.

STATEMENTS REGARDING FEDERALLY SPONSORED RESEARCH

Not applicable.

BACKGROUND OF THE INVENTION

In view of the dangers associated with automobile travel, there is an ongoing need for enhanced automobile safety features. One possible area of increased automobile safety involves the vehicle's cruise control system. A cruise control system permits an operator to set a predetermined speed of travel and controls the vehicle to maintain the predetermined speed. However, as the vehicle approaches obstacles, such as other cars and pedestrians, driver attention and intervention are necessary to actuate the vehicle's brakes thus overriding the cruise control system and avoiding collisions.

To enhance the safety of cruise control systems, "intelligent" cruise control systems have been suggested. Intelligent cruise control systems typically include a detector for detecting obstacles in the path of the vehicle and a controller for actuating the vehicle's brakes and overriding the cruise control system in response to the detection of obstacles. Advantageously, intelligent cruise control systems can reduce the dependency on the driver for avoiding collisions.

Another possible area of increased automobile safety is in collision avoidance systems. Like intelligent cruise control systems, collision avoidance systems generally include a detector for detecting obstacles in the path of the vehicle and a controller for actuating the vehicle's brakes in response to detected obstacles in order to avoid collisions.

In both the intelligent cruise control and collision avoidance applications, it is necessary to provide a detector capable of accurately and reliably detecting objects in the path of the vehicle. Such a detector is sometimes referred to as a Forward Looking Sensor (FLS) and must be relatively insensitive to the relative location of the automobile and obstacles and environmental conditions, such as temperature, humidity, ice and rain.

Radar is a suitable technology for implementing an automotive FLS. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

As with any consumer product, extensive operational testing in a multitude of scenarios and under a multitude of conditions to verify the accuracy and reliability of the product is desirable and may be the subject of a government mandate. One way to test the detection performance of an automotive FLS is to mount the FLS to an automobile and drive the automobile around a test track which presents multiple scenarios and conditions to the FLS. The response of the FLS to each scenario and condition is measured to verify the accuracy of the detection. Such testing may be performed with or without closing the feedback loop to the vehicle braking system. However, in order to verify the detection performance of the FLS in a multitude of scenarios and conditions, the trial would likely require millions of miles of test driving. Moreover, if it is necessary or desirable to test each FLS, this method of testing an automotive FLS is not generally feasible due to cost, time and reproduceability considerations.

SUMMARY OF THE INVENTION

The invention relates to a test station for testing the performance of an automotive Forward Looking Sensor (FLS) utilizing radar technology to detect one or more obstacles, or targets within the field of view of the FLS. The test station includes an anechoic chamber having a first end at which the FLS under test is disposed and a second end at which a Transmit/Receive Test (TRT) system is disposed.

The anechoic chamber is provided having a quiet zone in which reflections of electromagnetic energy having a frequency on the order of 77 GHz are minimized. The dimensions of the chamber are selected such that a test antenna of the TRT system receives a substantially far field radiation signal from the FLS and the RF absorber material within the chamber provides the quiet zone at a frequency of about 77 GHz. In one illustrated embodiment, the chamber is provided having a wall with an RF transparent window therein. The FLS is mounted to a platform behind the window and transmits and receives RF signals through the window. This avoids the need to access the chamber. In an alternative embodiment, the RF transparent window is replaced by an opening and the FLS is disposed through the opening in the chamber wall. In yet another alternative embodiment, the FLS may be mounted on a test vehicle inside the chamber.

The TRT system includes a test antenna provided by an array of antenna elements responsive to an RF signal transmitted by the FLS. The test antenna receives an RF signal transmitted by the FLS and feeds the received signal to a Transmit/Receive (TR) RF processor. The TR RF processor receives the signals fed thereto, processes the RF signals and provides a processed RF signal for re-transmission to the FLS. The processed RF signal simulates a particular set of objects which the FLS should detect and track as appropriate. More particularly, the TR RF processor processes a received RF signal by selectively shifting the frequency and/or adjusting the amplitude of the received RF signal. In one embodiment, the TR RF processor includes a plurality of TR RF processor modules, each coupled to one or more antenna elements for processing RF signals received by the respective one or more antenna elements.

The test station also includes a TRT system controller coupled to the FLS and the TR RF processor. The controller provides to the TR RF processor control signals which control a frequency shift and/or an amplitude adjustment to be applied to the received RF signal. More particularly, the control signals are coupled to the plurality of TR RF processor modules and control the amount of any frequency shift and/or amplitude adjustment introduced thereby. These control signals cause predetermined ones of the antenna elements to radiate predetermined levels of electromagnetic energy of predetermined frequencies. The predetermined patterns of electromagnetic energy simulate reflections of electromagnetic energy from known objects. Thus, a simulation map indicating the manner in which particular antenna elements should be excited in order to simulate predetermined scenes is stored for use by the controller in testing FLS performance.

For example, a first scene corresponding to a car having an FLS mounted thereon approaching a bridge can be represented by exciting first predetermined antenna elements in the test antenna array in a first predetermined manner. A second scene corresponding to a car having the FLS mounted thereon approaching a stopped car in the road can be represented by exciting second predetermined ones of the antenna elements in the test antenna array in a second predetermined manner. Thus, in this manner the TRT system can process RF signals to simulate a plurality of different scenes.

In response to receipt of the processed RF signal and to control signals provided to the FLS by the controller, the FLS provides output signals to the controller for comparison to test criteria. Control signals provided by the controller to the FLS include a yaw rate signal and a velocity signal. The yaw rate signal corresponds to a yaw rate associated with a vehicle on which the FLS is mounted when encountering the simulated scene and the velocity signal corresponds to a velocity of the vehicle. These parameters are stored by the controller in association with each scene simulated by the TRT system.

The controller may include a data recorder for recording the output signals from the FLS. The FLS output signals include a range signal indicative of a range associated with a primary target in the simulated scene, a range rate signal indicative of a range rate associated with the primary target in the simulated scene and an azimuth signal indicative of the azimuth associated with the target in the simulated scene. The FLS output signals can also include range, range rate and azimuth signals for a plurality of non-primary targets within the field of view of the FLS.

In one embodiment, each TR RF processor module includes a single-sideband generator which receives a first RF signal at a first port thereof from a respective antenna element. A frequency synthesizer, controlled by the controller, provides a second RF signal to a second input port of the single-sideband generator. The single-sideband generator selectively shifts the frequency of the first RF signal by an amount corresponding to the frequency of the second RF signal and suppresses a sideband of the first RF signal to provide a single-sideband signal at an output port of the single-sideband generator which is coupled to the respective antenna element. The TR RF processor module further includes an amplitude adjustment element coupled to the controller and responsive to the single-sideband signal for adjusting its amplitude by a selected amount to provide a processed signal for retransmission into the chamber by the respective antenna element.

The TR RF processor module may further include a circulator having a first port coupled to the respective antenna element, a second port coupled to an output of the single-sideband generator and a third port coupled to an input of the single-sideband generator. The circulator directs the received RF signal from the antenna element to the first input port of the single-sideband generator, directs the processed RF signal from the output port of the single-sideband generator to the antenna element and minimizes coupling of, or isolates the processed RF signal from the input port of the single-sideband generator.

Also described is a method for testing the performance of an automotive FLS which includes the steps of providing a test chamber having a first end at which an FLS is disposed and a second end at which a test antenna array is disposed. The method further includes receiving at the test antenna array an RF signal transmitted into the chamber by the FLS, processing the received signal (in order to simulate a predetermined scene in the field of view of the FLS) and transmitting the processed signal into the test chamber to the FLS. The received signal is processed by selectively adjusting the frequency and amplitude of the received signal in order to simulate the predetermined scene and the processed signal is transmitted through predetermined ones of a plurality of antenna elements which provide the test antenna array.

BRIEF DESCRIPTION OF THE DRAWINGS

The foregoing features of this invention, as well as the invention itself, may be more fully understood from the following description of the drawings in which:

FIG. 6 is a top view of the test chamber of the test station of FIG. 1;

FIG. 6A is a cross-sectional view of the test chamber taken along line 6A—6A of FIG. 6;

FIG. 6B is a cross-sectional view of the test chamber taken along line 6B—6B of FIG. 6;

FIG. 10 is an illustrative simulated scene in the field of view of an automotive FLS under test;

DETAILED DESCRIPTION OF THE INVENTION

Figure 1:
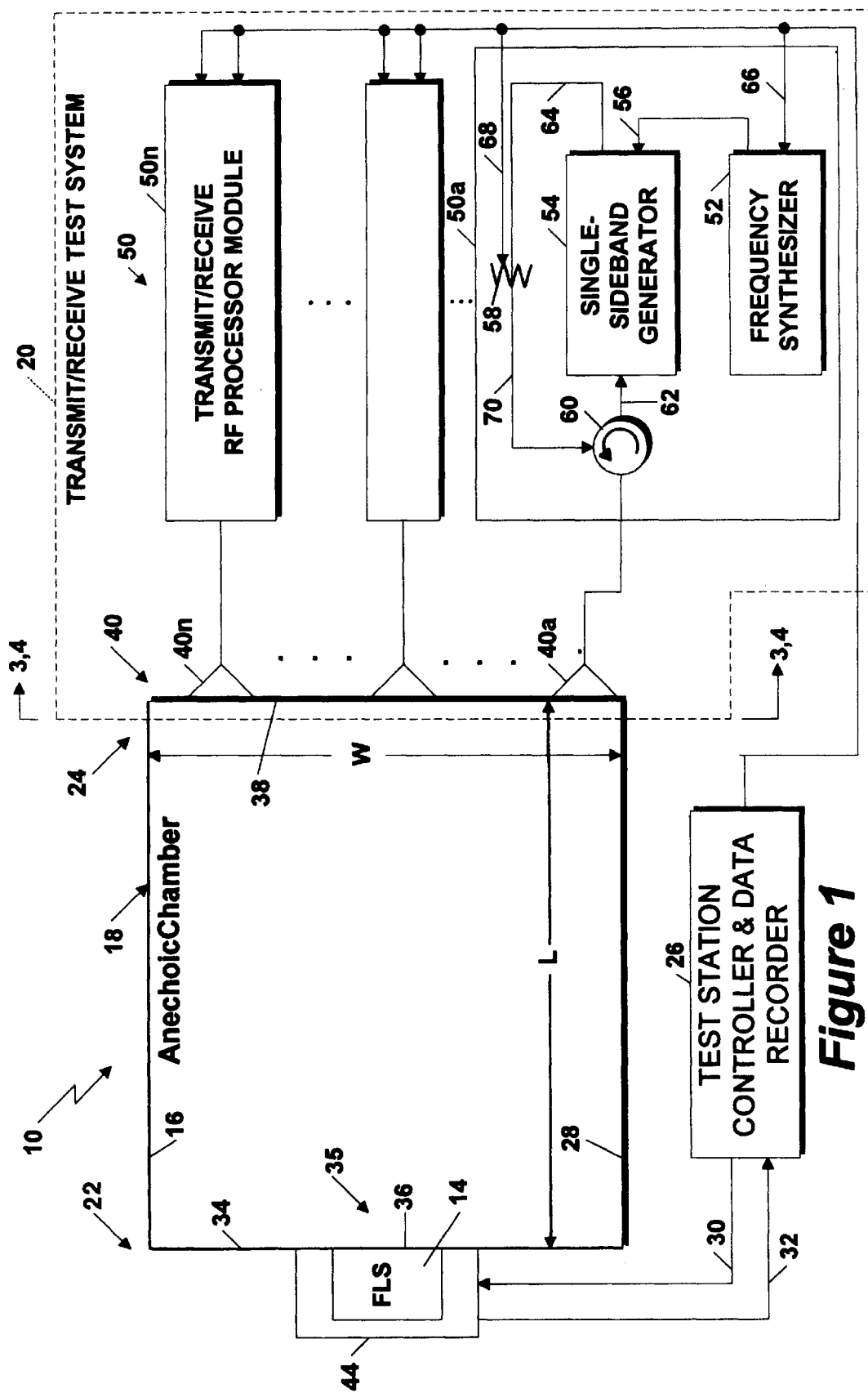
FIG. 1 is a block diagram of a test station for testing the performance of an automotive Forward Looking Sensor (FLS)

Referring to FIG. 1, a test station 10 for testing the performance of a radar sensor 14 includes a test chamber 18 and a Transmit/Receive Test (TRT) system 20 which includes a test antenna array 40. The test chamber 18 has a first end 22 at which the sensor 14 is disposed and a second end 24 at which the TRT system 20 is disposed. The test chamber 18 has side walls 16, 28 and end walls 34, 38. As will be described further below in conjunction with FIGS. 7 and 8, sensor 14 includes one or more transmitting and receiving antenna elements. In the illustrative embodiment, the sensor 14 is positioned adjacent to end wall 34 and the test antenna array 40 is located adjacent to end wall 38, as shown. It will be appreciated by those of ordinary skill in the art however, that the sensor 14 and the test antenna array 40 may, alternatively, be located at various positions relative to the chamber 18, both proximal to and distal from the respective end wall 34, 38.

In one embodiment, chamber wall 34 is provided having an RF transparent window 36 therein. In this case, the antenna elements of the sensor 14 are placed outside of the test chamber 18 and are positioned such that they radiate into the chamber 18. In an alternative embodiment, the RF transparent window may be replaced by an opening in the chamber wall 34. The antenna elements of the sensor 14 may then be partially or fully placed in the chamber 18. The particular position at which the sensor 14 and test antenna array 40 are disposed relative to the chamber walls is selected in accordance with a variety of factors including, but not limited to, the distance by which the test antenna array 40 must be spaced from sensor 14 to place test antenna array in the far field of the transmitting and receiving antenna elements of the sensor 14.

The sensor 14 under test will be described in conjunction with an automotive Forward Looking Sensor (FLS) 14 adapted for mounting on an automobile and detecting one or more objects, or targets in the field of view of the FLS. In this application, the targets include other cars, trees, signs, pedestrians, etc. . . . The FLS 14 detects one or more targets in its field of view and classifies each target as either a "primary" target or a "secondary" target. The primary, or lead target may be defined in various ways and, in the illustrative embodiment, is the closest object in the trajectory, or lane of the automobile on which the FLS 14 is mounted. The FLS 14 generates one or more output signals characterizing the primary target within its field of view. The FLS output signals may be coupled to a longitudinal control unit of the vehicle (not shown) for use in an intelligent cruise control or collision avoidance system. It will be appreciated by those of ordinary skill in the art that various types of sensors may be tested in the test station 10 according to the techniques described herein.

In use, the FLS 14 transmits an RF signal into the chamber 18. The TRT system 20 receives the transmitted RF signal at the antenna array 40 and provides the signal to a Transmit/Receive Radio Frequency (TR RF) processor 50. The TR RF processor 50 processes the RF signal fed thereto from the antenna array 40 and transmits the processed signal back to the FLS 14 via antenna array 40. The processing of the received RF signal by the TR RF processor 50 causes a predetermined scene to be simulated. The FLS 14 responds to the processed signal by detecting a primary target within the field of view of the FLS 14.

Figure 7:
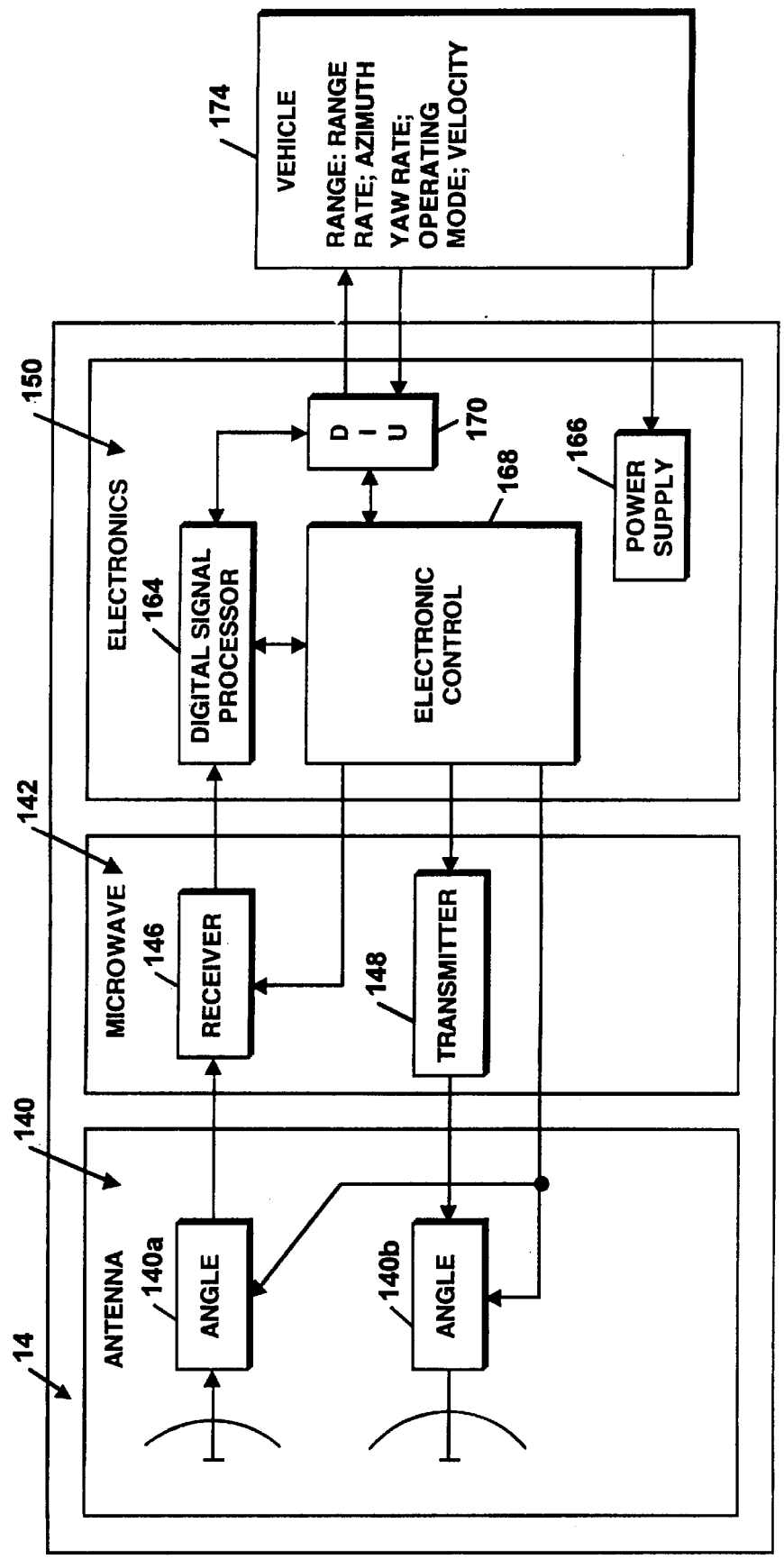
FIG. 7 is a block diagram of an automotive FLS suitable for testing in the test station of FIG. 1.
Figure 8:
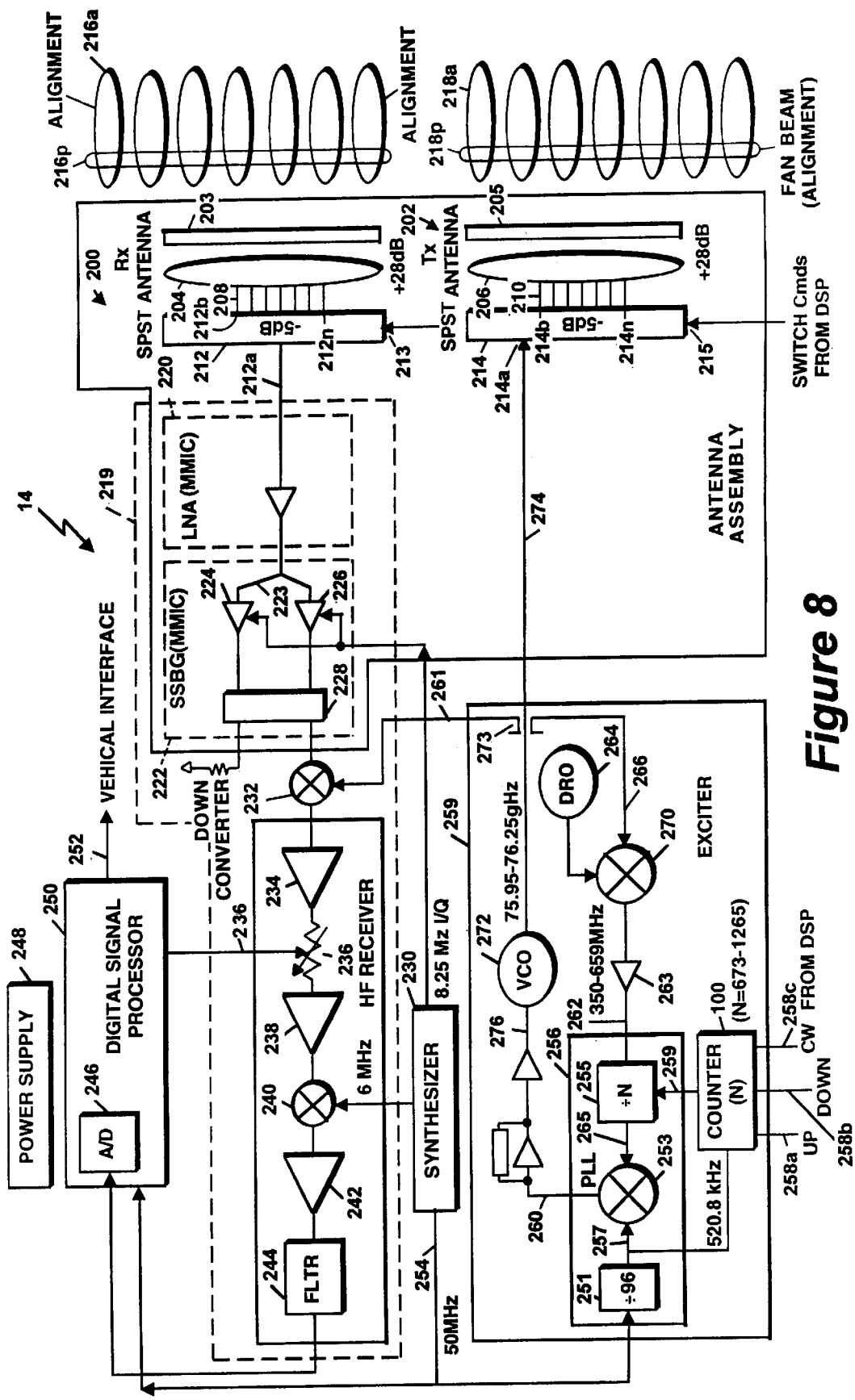
FIG. 8 is a more detailed block diagram of an automotive FLS suitable for testing in the test station of FIG. 1.

The chamber 18 is a Radio Frequency (RF) anechoic chamber designed such that FLS 14 presents a far field radiation pattern at a predetermined frequency to antenna array 40 and provides minimal reflection conditions at the predetermined frequency. In the illustrative embodiment, the predetermined frequency of interest is approximately 77 GHz, the frequency of operation of the automotive FLS 14. The size and shape of a quiet zone in the anechoic chamber 18 (i.e., the volume in which reflections from the internal surfaces of the chamber are below a specified acceptable signal level) is designed to prevent saturation of an analog-to-digital (A/D) converter of the FLS 14 (FIGS. 7 and 8). In the illustrative embodiment, the quiet zone is on the order of 3 feet by 3 feet.

The anechoic chamber 18 includes an outer shell comprised of any material which appears as an electrical conductor to signals having a frequency of about 77 GHz to provide shielding and an electromagnetic absorbent lining material covering the inner surface of the outer shell. Conventional techniques are suitable for providing the anechoic chamber 18, including the particular selection of materials. For example, the lining material is selected based on its dielectric properties, preferably having a relative permittivity near unity to maximize reflection at the interface between the lining and the outer shell and having increasing resistive loss through the material. For example, foam plastics are suitable for lining the walls of the chamber 18 and may be loaded with carbon, ferrite or other conducting particles on a graded or layer basis to increase the resistive loss of the lining material. Further, providing the lining material in the shape of cones or pyramids assists in providing a tapered absorption to reduce reflection, from minimal absorption at the apex of the cone where the resistive loading is at a minimum, to full absorption at the base where the resistive loading is at a maximum. Due to the relatively high operating frequency of the FLS 14, the wall lining material may have a thickness on the order of between one and two inches and provide a reflection characteristic better than −40 dB at the desired frequency of operation.

The dimensions of the chamber 18 are selected to provide the antenna array 40 within the far field of the FLS antenna, as described further below in conjunction with FIG. 6. In the illustrative embodiment, the chamber 18 has a length (L) on the order of twenty-seven meters, a width (W) on the order of nine meters and a height (H) on the order of nine meters. It will be appreciated by those of ordinary skill in the art that the dimensions, materials and shape of the chamber 18 can be varied to meet particular test applications and requirements.

In the illustrative embodiment, the window 36 which is transparent to RF energy is located through the end wall 34 at the end 22 of the chamber 18 at which the FLS 14 is disposed. One suitable RF transparent material for providing the window 36 is plastic. In the illustrated embodiment, the FLS 14 is mounted on a stationary platform behind the window 36, so that transmitting and receiving antenna of the FLS (FIGS. 7 and 8) are in RF communication with the interior of the chamber 18.

An environmental chamber 44 disposed about the FLS 14 permits the simulation of various weather conditions to which the FLS 14 may be exposed in actual use. For example, environmental chamber 44 simulates high temperature conditions, low temperature conditions, temperature changes, humidity levels, ice, rain and any other environmental condition. The environmental chamber 44 may be manually controlled or automatically controlled by a test station controller 26.

The test antenna array 40 of the TRT system 20 is disposed at the second end 24 of the chamber 18 and may be mounted to the chamber 18 in various ways. As one example, the end 24 of the chamber has an RF transparent window (not shown) of a size and shape suitable to permit the array 40 of antenna elements to be in RF communication with the chamber 18. Alternatively, chamber wall 38 may be provided having one or more openings therein, with such openings having a size and shape selected to accommodate antenna elements of the array 40 and allow the antenna elements to receive RF signals from and transmit RF signals to the sensor 14. Alternatively still, the end 24 of the chamber may be open and the antenna array 40 may be mounted on the chamber end wall 38 which, in turn, is mounted to the open end 24 of the chamber 18 so as to close the chamber.

The test antenna array 40 includes a plurality of antenna elements 40a–40n each of which may be coupled to the TR RF processor 50. Each antenna element, or simply antenna, 40a–40n is operative to receive an RF signal transmitted by the FLS 14 and to couple the received signal to the TR RF processor 50 for processing. The processed signal is then transmitted via the respective antenna 40a–40n into the chamber 18. Stated differently, RF signals received by the antenna 40a–40n are processed and retransmitted back into the chamber 18 for reception by the FLS 14.

In the embodiment of FIG. 1, the TR RF processor 50 includes a plurality of TR RF processor modules 50a–50n, each one coupled to and associated with a corresponding antenna 40a–40n, respectively. Considering TR RF processor module 50a as representative of processor modules 50b–50n, each TR RF processor module includes a circulator 60 having a first port coupled to the antenna element 40a, a second port coupled to an input port of a single-sideband generator (SSBG) 54 and a third port coupled through an amplitude adjustment element 58 to an output port of the SSBG 54. The SSBG 54 receives the RF signal 62 received by the antenna element 40a via the circulator 60. In response to a control signal 66 fed thereto from a controller 26, frequency synthesizer 52 generates an offset signal 56 having an amplitude and frequency selected by controller 26. The offset signal 56 is coupled to a second input port of the SSBG 54. The amplitude and frequency of offset signal 56 is selected to simulate a particular Doppler and/or range offset to FLS 14. It should thus be noted that single-sideband operation is provided by SSBG 54 over a range of frequencies fed thereto from frequency synthesizer 52.

In a preferred embodiment, synthesizer 52 is provided as a bus-controllable synthesizer capable of generating frequencies in at least the range of 10 KHz to 250 KHz with a relatively wide range of signal levels (e.g., −50 dBm to +10 dBm). The frequency synthesizer may be provided, for example, as the type manufactured by Hewlett-Packard and identified as an HP890A multifunction synthesizer. Those of ordinary skill in the art will appreciate, of course, that other synthesizers having similar performance characteristics may also be used.

In response to the offset signal 56, the SSBG 54 shifts the frequency of the received RF signal 62 and suppresses one of its sidebands to provide a frequency-shifted, single-sideband signal coupled through signal path 64 to the amplitude adjustment element 58.

Amplitude adjustment element 58 adjusts the amplitude of the signal 64 in accordance with an amplitude adjustment control signal 68 provided by controller 26 to provide a processed signal 70 to the circulator 60. The circulator 60 thus provides a first relatively low insertion loss signal path to signals propagating from the antenna element 40a to the input port of the SSBG 54 and a second relatively low insertion loss signal path to signals propagating from the output port of the SSBG 54 to the antenna element 40a while providing a relatively high isolation characteristic between the first input port and the output port of the SSBG 54.

The amplitude adjustment element 58 may be a variable attenuator and the circulator 50 may be a ferrite circulator. In an alternate embodiment, the amplitude adjustment element 58 may be provided as a programmable digital attenuator.

Figure 2:
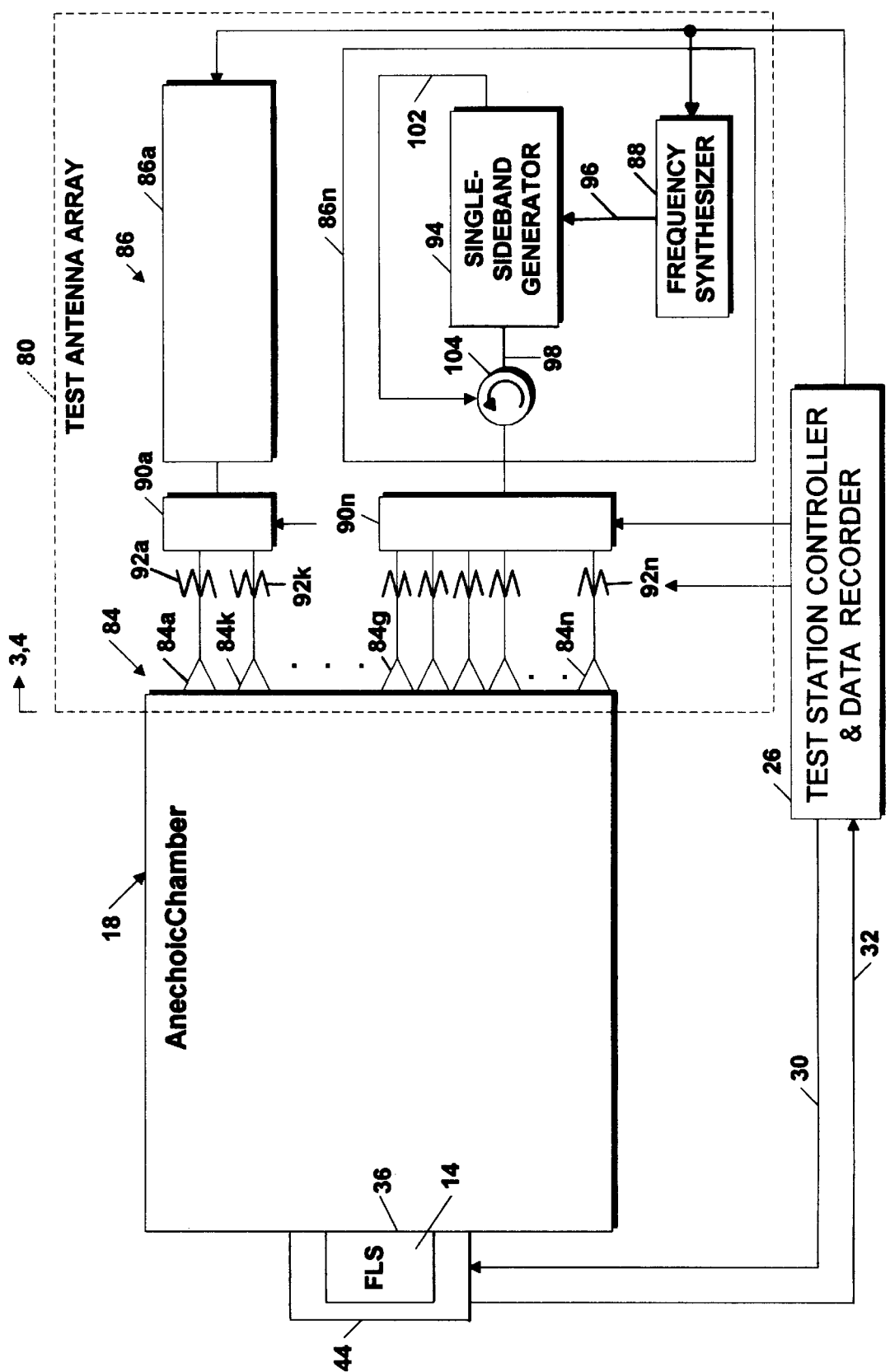
FIG. 2 is a block diagram of an alternate embodiment of the test station of FIG. 1.

It will be appreciated by those of ordinary skill in the art that certain electronic components may be shared by more than one antenna 40a–40n. As one example, the frequency synthesizer 52 may be shared by a plurality of TR RF processor modules 50a–50n coupled to respective antenna 40a–40n. This arrangement may be suitable, for example, where the antenna sharing the same frequency synthesizer simulate portions of the same object. As another alternative, it may be possible to eliminate certain electronics for predetermined ones of the antenna 40a–40n. A further alternative is illustrated in FIG. 2 and described below, in which TR RF processor modules are shared by, and switched between, more than one antenna.

The test station 10 includes the controller 26 coupled to the FLS 14 and to the TRT system 20. The controller 26 provides control signals to the FLS 14 via a control signal bus 30 and receives, from the FLS 14, one or more output signals via an output signal bus 32. The FLS output signal on bus 32 includes at least one of: (1) a range signal indicative of the range to a detected primary target, (2) a range rate signal indicative of the range rate associated with the detected primary target, and (3) an azimuth signal indicative of the azimuth of the detected primary target relative to the FLS 14. The controller 26 includes a data recorder suitable for storing the output signals 32 from the FLS 14, such as may be provided by a standard computer disk drive.

The control signals provided by the controller 26 to the FLS 14 include a yaw rate signal representative of a yaw rate of the FLS 14 relative to the simulated scene and a velocity signal representative of a velocity of the FLS relative to the simulated scene. In the illustrative embodiment, the controller 26 is implemented on a work station, such as of the type sold by Sun Microsystems, Inc.

The controller 26 further provides control signals to the TRT system 20. In particular, the controller 26 controls the frequency synthesizer 52 of the TR RF processor modules 50a–50n via control signal line 66, thereby controlling the extent of any frequency shift introduced into the received RF signal 62 and retransmitted to FLS 14 via antenna 40. Controller 26 also provides a control signal 68 to amplitude adjustment element 58 of the TR RF processor modules 50a–50n. To simulate a particular scenario, TRT system 20 must transmit to FLS 14 a signal having amplitude and frequency characteristics representative of the particular scenario being simulated. The characteristics are known a priori and thus a predetermined set of control signals are pre-stored in controller 26 and are provided to TRT system 20 when needed. Among the control signals provided by controller 26 is a timing control signal which controls system timing to allow simulation of real time scenarios. It should be noted that a timing control signal exists for each scenario simulated in system 10.

Referring to FIG. 2, an alternate test station 10' includes the anechoic chamber 18 and controller 26 shown and described above in conjunction with FIG. 1. Like TRT system 20 of FIG. 1, the TRT system 80 includes an antenna array 84 provided from antenna elements 84a–84n and a TR RF processor 86 including a plurality of TR RF processor modules 86a–86n. Each of the TR RF processor modules 86a–86n includes a frequency synthesizer 88 and an SSBG 94 responsive to an offset signal 96 provided by the frequency synthesizer 88 and to a received RF signal 98. The output signal 102 of the single-sideband generator 94 is coupled through a circulator 104 to a respective one of switches 90a–90n.

The TR RF processor 86 differs from TR RF processor 50 in FIG. 1 in that at least one of the TR RF processor modules 86a–86n is coupled to and associated with a plurality of antenna 84a–84n. To this end, switches 90a–90n selectively couple respective ones of TR RF processor modules 86a–86n to one of the associated antenna under the control of the controller 26. For example, switch 90a selectively couples TR RF processor module 86a to one of associated antenna 84a–84k and switch 90n selectively couples TR RF processor module 86n to one of associated antenna 84q–84n.

Each antenna 84a–84n has a respective amplitude adjustment element 92a–92n coupled between the antenna and the respective switch 90a–90n, as shown, in order to provide individual amplitude adjustment under the control of the controller 26. Further, the antenna 84a–84n may be provided with independent frequency control by providing a first control signal to the frequency synthesizer 88, to cause a first offset signal to be generated when the respective switch 90a–90n is in a first position (i.e., coupling a first antenna to the TR RF processor module 86n) and providing a second, different control signal to the frequency synthesizer to cause a second, different frequency offset signal to be generated when the switch 90a–90n is in a second, different position. Switches 90a–90n may be provided, for example, as field effect transistor (FET) switches having suitable switching speeds, insertion loss characteristics, isolation characteristics and impedance matching characteristics in the frequency range of operation. Alternatively, switches 90a–90n may be provided as waveguide mounted diode switches having suitable switch characteristics in the frequency range of operation.

Figure 3:
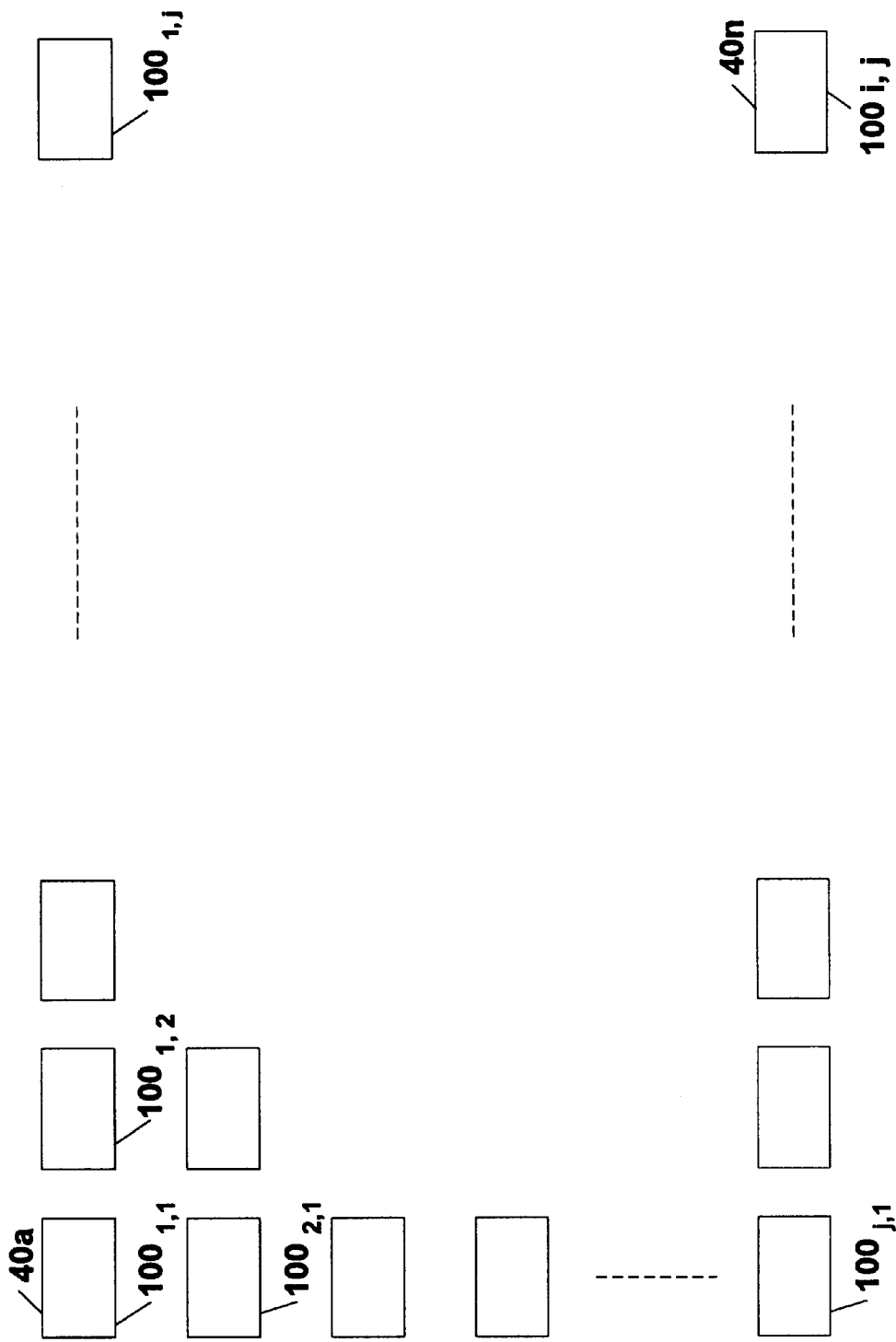
FIG. 3 illustrates an antenna array of the test station of FIG. 1.

Referring to FIG. 3, a view of an illustrative antenna array 40 taken along line 3,4—3,4 of FIG. 1 is shown. The locations of the antenna elements 40a–40n within the array 40 are labeled $100_{1,1}$–$100_{j,k}$, with the array containing j rows and k columns of antenna elements. It will be appreciated by those of ordinary skill in the art that the dimensions of the array can be readily varied to accommodate a particular test application including a single element array in which j=k=1 and that array shapes other than rectangular shapes (e.g. circular and irregular array shapes) may be used.

The number of antenna elements, n, comprising the array 40 is selected to provide a predetermined resolution based on the dimensions of each antenna element 40a–40n and the overall dimensions of the array. Further, the overall dimensions of the antenna array 40 are selected to fill a predetermined portion of the field of view of the automotive FLS 14 given the length (L) of the chamber 18 (i.e., the distance between the FLS and the array 40). In the illustrative embodiment, the array is sized to substantially fill the field of view of the FLS 14 at a distance of 100M in order to simulate three lanes of travel and two breakdown lanes. In this manner, a simulation in which the FLS is mounted on a vehicle traveling in the middle lane may be implemented. Thus, TRT system 20 may simulate other vehicles or objects occupying the same lane as the FLS, other lanes than the FLS and the TRT system 20 may also simulate vehicles or objects moving between adjacent lanes and the lane of the FLS.

Figure 4:
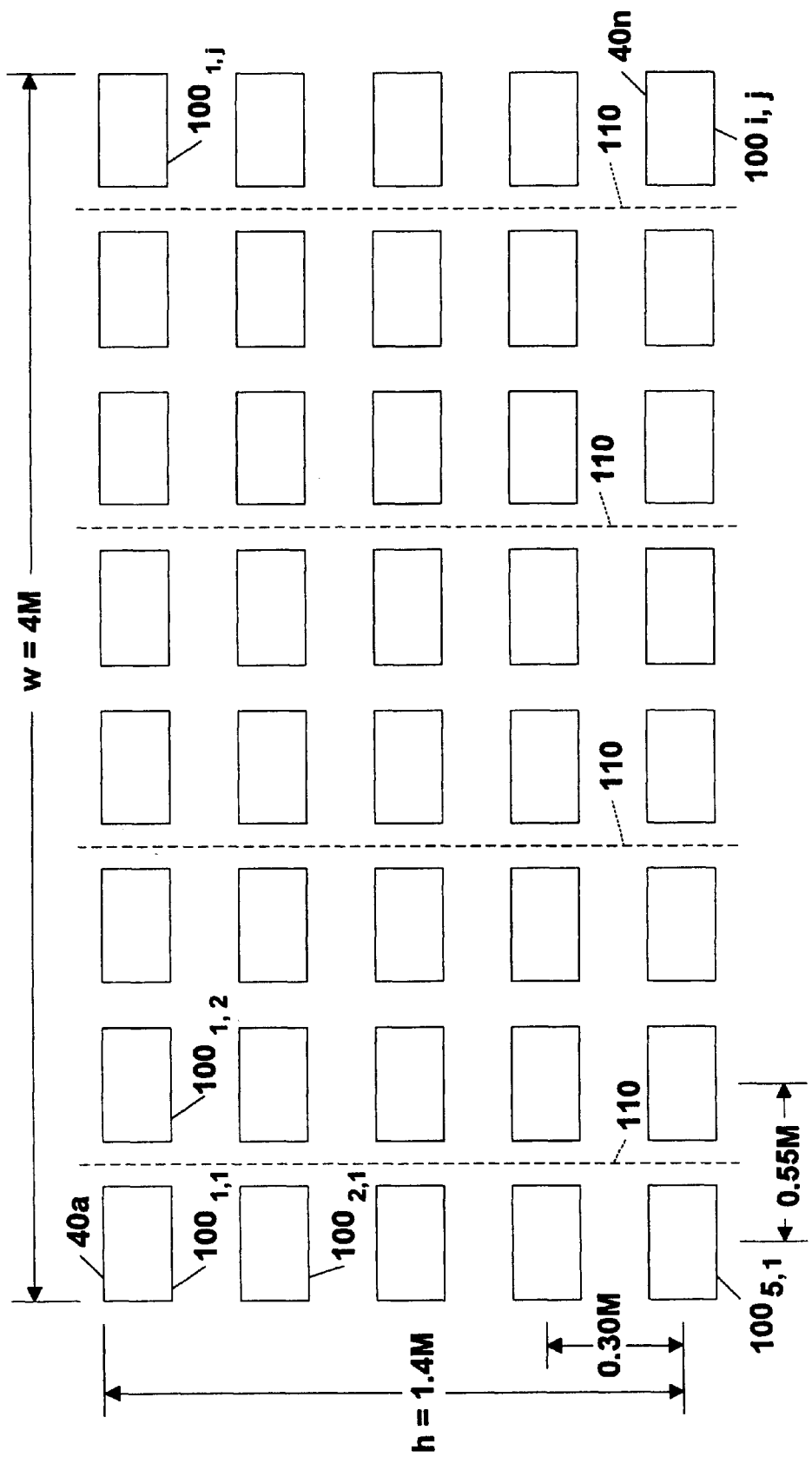
FIG. 4 illustrates an alternate embodiment of an antenna array of the test station of FIG. 1.

Referring to FIG. 4, one suitable antenna array 40 is shown to have a width (w) on the order of four meters and a height (h) on the order of 1.4 meters. The illustrative antenna array 40 is a 5×8 array (j=5, k=8) and suitable to model three lanes of traffic and two breakdown lanes, with vertical dashed lines 110 marking the boundaries between such lanes.

Figures 5, 5A:
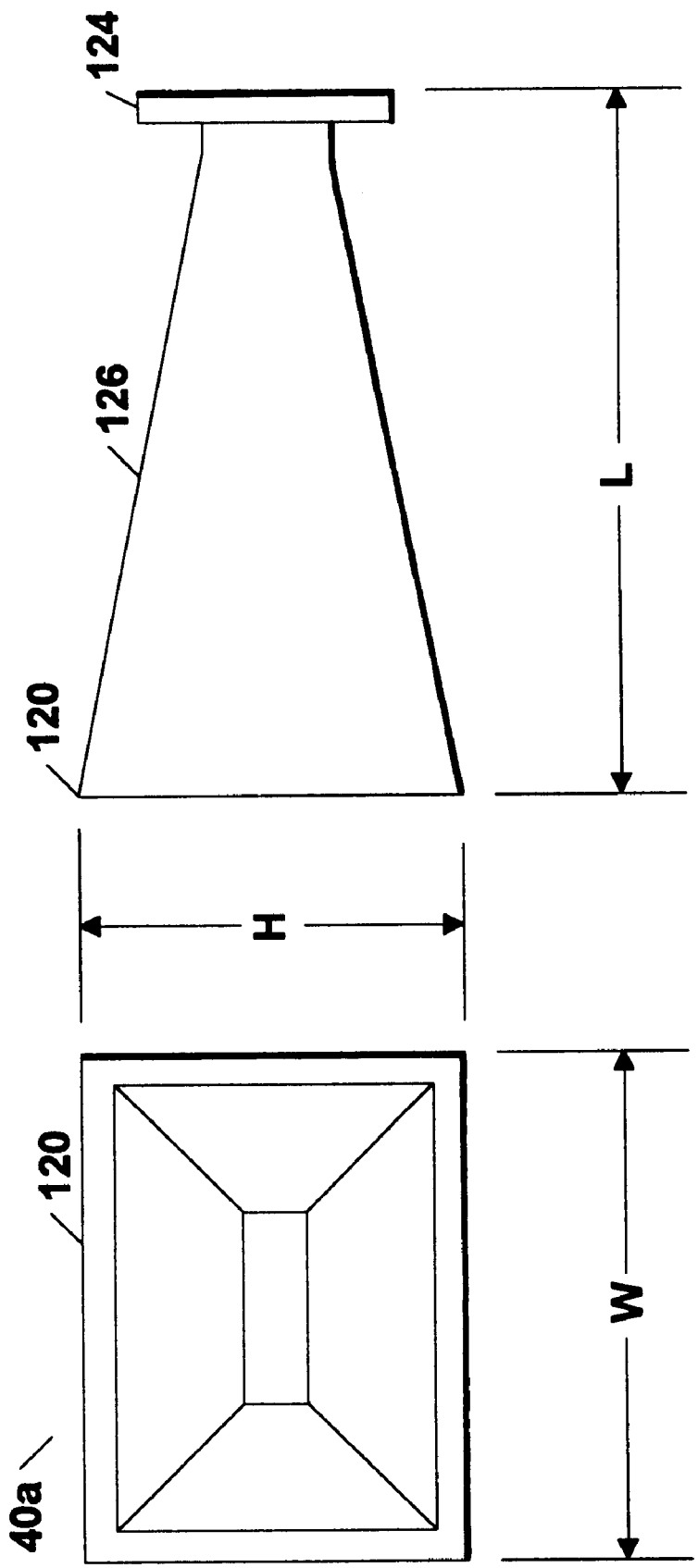
FIG. 5 is a front view of an antenna element of the array of FIG. 4.
FIG. 5A is a side view of the antenna element of FIG. 5.

Referring to FIG. 5, a suitable antenna element 40a for use at 77 GHz in the antenna array 40 is shown. The antenna 40a is a horn antenna having a rectangular aperture 120. The horn antenna element 40a is commercially available from Aerowave under product number 12-7020.

Referring also to the side view of the antenna element 40a in FIG. 5A, the rectangular aperture 120 is coupled to the radiating element 124 via a tapered, horn-shaped feed 126. In the illustrative embodiment, the height (H) of the element 40a is 0.55 inches, the width (W) is 0.68 inches, the length (L) is 1.85 inches and the standard gain is on the order of 20 dB.

Those of ordinary skill in the art will appreciate of course that other antenna elements, including, but not limited to, circular horn antenna, printed circuit antenna elements of rectangular or any other shape, slotted wave guide antenna, etc. . . . may also be used. Also, it may be desirable to use combinations of such antenna elements. The particular type or types of antenna elements which are used to provide the array are selected in accordance with a variety of factors including, but not limited to, the desired polarization of the processed signal transmitted by the TR RF processor modules and gain.

Referring to FIG. 6, a top view of the test chamber 18 is shown. As noted above, conventional techniques for designing and implementing the anechoic chamber 18, including the determination of dimensions, are suitable. In general, it is desirable that the length (L) of the chamber 18 be approximately two times the square of the diameter of an antenna aperture 40a–40n divided by the wavelength of the RF signal being measured. In the illustrative embodiment, the antenna aperture is on the order of nine inches and the operational frequency about 77 GHz. The free space wavelength at a frequency of 77 GHz is about 0.39 cm, yielding a preferred chamber length (L) on the order of ninety feet, or twenty-seven meters. Further, a preferred length-to-width (and height) ratio for the chamber 18 is on the order of 3:1. Thus, in the illustrative embodiment, the width (W) and height (H) of the chamber are on the order of thirty feet, or nine meters.

Referring also to FIG. 6A, a cross-sectional view of the chamber 18 taken along line 6A—6A of FIG. 6 shows the FLS 14 centered relative to the height (H) and width (W) of the chamber end wall 34. Similarly, the cross-sectional view of FIG. 6B taken along line 6B—6B of FIG. 6 shows the antenna array 40 centered relative to the height (H) and width (W) of the chamber end wall 38.

Referring to FIG. 7, a block diagram of a Frequency Modulated Continuous Wave (FMCW) automotive FLS 14 is shown to include an antenna assembly 140, a microwave assembly 142, having both a transmitter 146 and a receiver 148, and an electronic assembly 150, consisting of a signal processor 164, power supplies 166, control circuits 168 and a digital interface 170 with the automobile 174. The antenna assembly 140 includes two antennas 140a, 140b one for transmitting and one for receiving. The antenna are multi-lobed antenna controlled in parallel so as to point in the same direction. Various circuitry for selecting the angle of the antenna is suitable, including a multi-position switch.

The output from the receiving antenna 140a is coupled to the microwave receiver 146, where one or more local oscillator signals are offset in frequency from the transmitted signal by a fixed amount. The output of the receiver 146 is at an offset frequency, with the target frequencies either above or below it.

The receiver 146 includes an analog-to-digital (A/D) converter which samples an attenuated version of the received signal at a rate at least twice the largest frequency out of the receiver. These signal samples are processed by an FFT within the processor 164 by determining the content of the signal within various frequency ranges (i.e., frequency bins). The FFT outputs serve as data for the rest of the signal processor 164. The remaining parts of the radar FLS 14 are standard items, including power supplies 166, control circuits 168 that include a system clock (crystal controlled oscillator) for frequency stability, and digital interface 170.

The manner by which the signal processor 164 processes the received RF signal to provide output signals to the vehicle indicative of range, range rate and/or azimuth of a primary target is described in a U.S. Pat. No. 6,011,507 entitled RADAR SYSTEM AND METHOD OF OPERATING SAME, filed on Nov. 12, 1996, which is incorporated herein by reference in its entirety.

Referring to FIG. 8, FLS 14 includes a transmit signal path provided by antenna 202 and a transmitter circuit 259 and a receive signal path provided by antenna 200 and receiver circuit 219. In general overview, FLS 14 operates in the following manner. Transmitter circuit 259 generates a transmitter signal coupled to antenna 202 via signal path 274. In a preferred embodiment, transmit antenna 202 includes a switch 214 having an input port 214a, a plurality of output ports 214b–214n and a control terminal 215 responsive to a control signal from a Digital Signal Processor (DSP) 250. Switch output ports 214b–214n are coupled via feed circuits 210 to a first side of a Rotman lens 206. A plurality of output ports of the Rotman lens 206 are coupled to a plurality of antenna elements 205 which may be provided, for example, as a plurality of conductive patches. The preferred arrangement for transmit antenna 202 is described in a U.S. Pat. No. 5,675,345, entitled ANTENNA, filed on Nov. 21, 1995 which is incorporated herein by reference in its entirety.

The transmitted RF signal intercepts objects in the RF signal transmit path and portions of the signal reflect from the objects and are received by the receive antenna 200. The received signal is fed to the receiver circuit 219 for down-converting and filtering and is subsequently fed to a DSP 250. In the illustrated embodiment, receive antenna 200 includes a switch 212 having input ports 212b–212n, output port 212a and a control terminal 213 responsive to a control signal from DSP 250. Switch input ports 212b–212n are coupled via feed circuits 208 to a first side of a Rotman lens 204. Output ports of the Rotman lens 204 are coupled to a plurality of antenna elements 203 which may take various forms, such as conductive patches. A preferred arrangement for the receive antenna 200 is also described in the above-referenced and incorporated co-pending U.S. patent application Ser. No. 08/561,513 filed on Nov. 21, 1995.

The receive antenna 200 produces a plurality of beams 216a–216p and the transmit antenna 202 produces a plurality beams 218a–218p. It will be appreciated by those of ordinary skill in the art that the number and pattern of beams provided by the antenna 200, 202 may be varied and may or may not be the same. In one embodiment, both the receive antenna 200 and the transmit antenna 204 include thirteen beams, twelve of which are substantially coplanar and one 216p, 218p of which is substantially non-coplanar and which provides a "check beam." The selection of the number and spacing of the antenna beams in order to accommodate FLS requirements is described in a co-pending U.S. Pat. No. 5,929,802 entitled AUTOMOTIVE FORWARD LOOKING SENSOR ARCHITECTURE, filed on Nov. 21, 1997 and incorporated herein by reference in its entirety.

In more detail, the transmit circuit 259 includes a voltage control oscillator (VCO) 272. In response to a control signal 276 fed thereto, VCO 272 provides an RF output signal 274 having a frequency in the range of about 75.95 GHz to 76.25 GHz. The particular frequency of the signal provided by VCO 272 is determined by the voltage of the VCO control signal 276. Thus, by varying the voltage of the VCO control signal 276, VCO 272 provides corresponding variations in the frequency of the RF signal 274 provided at the output of transmitter circuit 259. In this particular embodiment, transmitter circuit 259 operates as a Frequency Modulated Continuous Wave (FMCW) system. The VCO control signal 276 is provided having a characteristic shape as shown in FIG. 8A.

Figure 8A:
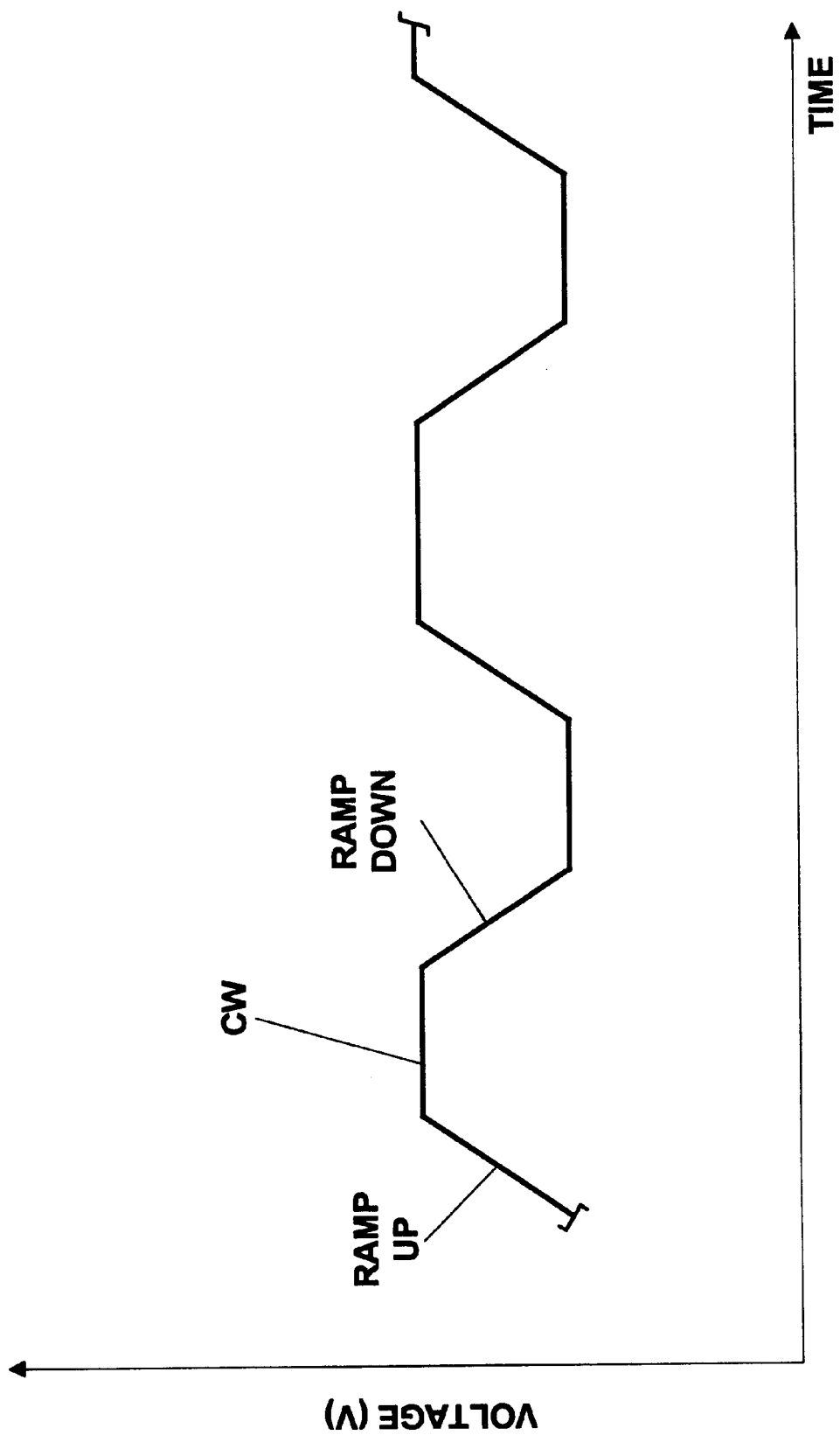
FIG. 8A is a waveform of the VCO control signal of the FLS of FIG. 8.

Referring to FIG. 8A, the VCO control signal 276 is shown to include a ramp up portion, a continuous wave (CW) portion, and a ramp down portion. For proper operation of the FLS 14, it is important that the VCO control signal 276 behave in a linear manner. Thus, to that end and referring again to FIG. 8, transmitter circuit 259 includes a linearization circuit 256.

In the illustrative embodiment, the linearization circuit 256 includes a phase-locked loop (PLL) circuit having a first frequency divider 251, a mixer 253 and a second frequency divider 255. The linearization circuit 256 is responsive to a clock signal 254 from a frequency synthesizer 230, a counter output signal 259 and an input signal 262. The counter output signal is provided by a counter 258 which is responsive to a plurality of control signals 258a–258c from the DSP 250 (including up, down and continuous wave signals) for dividing input signal 262 by a value N, where N is between 673 and 1265. The input signal 262 is provided at the output of an amplifier 263.

More particularly, a portion 266 of RF transmit signal 274 is coupled by coupler 273 to an RF input port of a mixer 270. A dielectric resonator oscillator (DRO) 264 provides the local oscillator signal to a local oscillator input port of mixer 270. Down-converting mixer 270 provides an intermediate frequency (IF) signal having a frequency in the range of about 350 MHz–659 MHz to an input port of amplifier 263. The amplifier 263 provides an input signal 262 to the linearization circuit 256.

The linearization circuit 256 is operative to provide an output signal 260 phase-locked to the input signal 262. The digital linearization circuit 256 compares the divided output frequency signal 265 of the millimeter wave VCO 272 with a fixed reference frequency signal 257. The divided output frequency signal 265 of the VCO is combined with the fixed reference frequency signal 257 in a phase/frequency detector which provides an error voltage 260 proportional to phase and frequency errors between the fixed reference frequency signal and the divided output frequency signal 265 of the VCO. The error voltage 260 is filtered and fed back to the VCO to tune it such that its divided output frequency signal 265 is equal to the reference signal 257. By making the divider 255 programmable and incrementing the divisor by a fixed amount at a fixed rate (set by the system's crystal clock), the VCO through the feedback loop changes its frequency in a linear manner (i.e., df/dt is constant). The VCO control signal, or chirp 276 is inherently linear since each frequency step and each time step are the same throughout the duration of the chirp. The phase-locked output signal 260 drives the VCO 272 which provides the RF signal 274 to the switch 214.

With the illustrated linearization circuit 256, the VCO control signal 276 changes frequency due to changes in the value N of the divider 255. Once the value N changes, the VCO control signal 276 approaches the new frequency in an exponential fashion, with the exact wave shape depending on loop parameters. The size of the frequency step and time step is approximately chosen in order to meet a predetermined VCO control signal (i.e., chirp signal) slope requirement. In the illustrative embodiment, the chirp slope is approximately 270 KHz/μsec, which corresponds to a time step of 1.9245 μsec. With this arrangement, the chirp is inherently linear (such as to within 0.04%), since each frequency step and each time step are the same as all others. Changes in the loop parameters which occur as a function of N may be compensated by adjusting the loop gain as a function of N. Alternative arrangements for providing the linearization circuit 256 are possible and are described in the above-referenced and incorporated co-pending U.S. patent application entitled AUTOMOTIVE FORWARD LOOKING SENSOR ARCHITECTURE, filed on even date herewith Nov. 21, 1997.

The receive signal path 214 is here adapted to receive continuous wave signals and includes antenna 200 which provides a receive signal to the input of a Low Noise Amplifier (LNA) 220. LNA 220 provides an amplified output signal to a power divider 223 of a single-sideband generator (SSBG) 222. Preferably, the LNA 220 and the SSBG 222 are implemented as one or more monolithic microwave integrated circuits (MMIC). However, it will be apparent to those of ordinary skill in the art that various manufacturing techniques including so-called chip and wire techniques and other arrangements are suitable for providing the components of the FLS 14.

The power divider 223 directs equal portions of the received RF signal into a pair of amplifiers 224, 226. The portion of the received signal provided to amplifier 224 is directed to a first input port of a quadrature coupler 228. The portion of the received signal provided to amplifier 226 is modified by introducing a 90° phase shift into the signal. Such a phase shift may be provided via lumped or distributed phase shift elements or by conveniently increasing the length of the signal path between power divider 223 and the input to amplifier 224 such that the signal path is longer by a distance corresponding to 90° at the frequency of interest than the signal path between power divider 223 and the input of amplifier 226. The 90° phase shifted signal is coupled to a second input port of the quadrature coupler 228. With the signals fed to the first and second input ports of the quadrature coupler shifted by 90°, the quadrature coupler subtracts the signals at a first output port thereof and adds the signals at a second output port thereof. Here the second output port is coupled to a RF input port of a down-converter circuit 232.

A portion of the transmitter signal is coupled from VCO 272 via a coupler 273 through signal path 261 to provide a local oscillator (LO) signal to the LO input port of down-converter 232. Down-converter 232 provides an Intermediate Frequency (IF) signal at an output port thereof.

The IF signal generated by the down-converter 232 is coupled to further receiver circuitry, including an amplifier 234, an amplitude attenuation element 236, a buffer 238, an IF mixer 240, a buffer 242 and a filter 244, all coupled in series, as shown. The amplitude attenuator 236 permits adjustment of the received signal level in order to avoid saturating an analog-to-digital (A/D) converter 246. The IF mixer 240 is responsive to an oscillator signal provided by the synthesizer 230 for further down-converting of the IF frequency to frequencies appropriate for processing by the A/D converter 246.

The output of the filter 244 is coupled to the A/D converter 246 associated with the DSP 250. The process implemented by the DSP 250 in response to received RF signals to detect and track a primary target is described in conjunction with the flow diagram of FIG. 9 and further in the U.S. Pat. No. 6,011,507, entitled RADAR SYSTEM AND METHOD OF OPERATING SAME, filed on Nov. 12, 1996, which is incorporated herein by reference in its entirety. Suffice it to say that the DSP 250 provides an output signal 252 which characterizes the primary target, for example, in terms of its range, range rate and/or angle, to a vehicle interface. A power supply 248 of the FLS 14 may be powered by the battery of the vehicle on which the FLS 14 is mounted.

Figure 9:
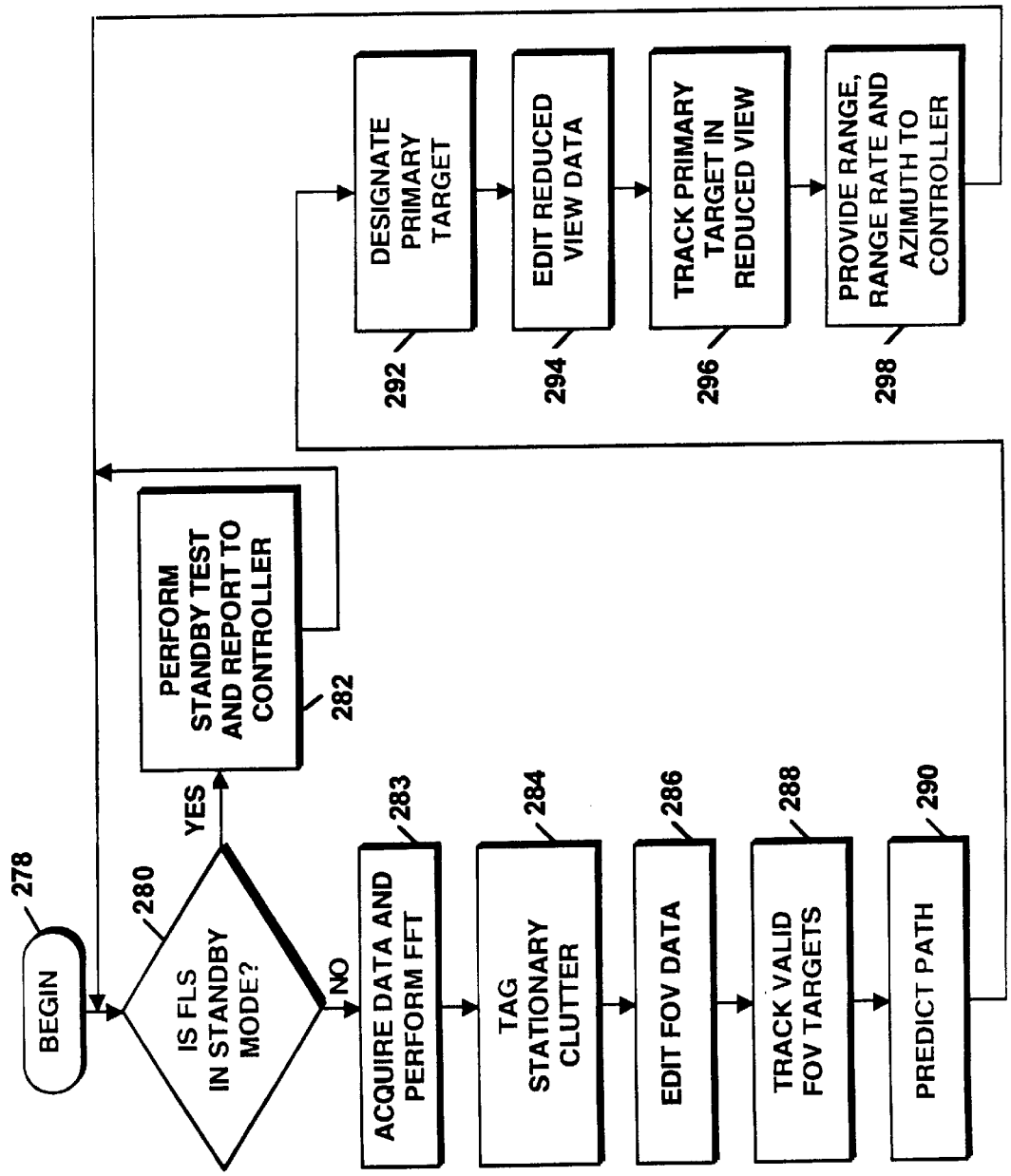
FIG. 9 is a flow diagram illustrating a method implemented by the FLS of FIG. 8 in detecting and tracking a primary target.

Referring to FIG. 9, a flow diagram of a method implemented by the processor 250 of FIG. 8 in detecting and tracking the primary target in the field of view of the FLS 14 is shown. The process commences in step 278, following which it is determined in step 280 whether the FLS 14 is in a standby mode of operation. Standby is a mode of operation in which the FLS 14 is powered by has not been activated by the vehicle driver. During standby mode, diagnostic tests are periodically repeated. If the FLS 14 is in standby mode, then the diagnostic test is performed in step 282 and the results reported to the controller 26. Thereafter, the process is repeated starting at step 280, as shown.

Alternatively, if the FLS 14 is not in standby mode, then processing proceeds to step 283 where the FLS is in an acquisition mode of operation in which target data is acquired and processed. In the acquisition mode, RF signals are received, down-converted and sampled to provide a stream of bits or digital signal samples. The DSP 250 (FIG. 8) performs a transform, such as a Fast Fourier Transform (FFT), on the signals and stores the results in a plurality of frequency bins. One of the frequency bins contains signals representing stationary clutter, and processing proceeds to step 284 in which stationary clutter in the field of view of the FLS 14 is tagged. Thereafter, in step 286, the data acquired from within the FLS field of view is edited, following which valid targets are identified and tracked in step 288. More particularly, a valid target is defined based on certain limits as to range and relative velocity. Processing steps 284, 286 and 288 made be collectively referred to as acquiring and tracking targets. Data may be edited in a variety of different ways such as comparison of the data to predetermined criteria and ignoring data samples which do not meet the criteria.

In step 290, the path of the vehicle on which the FLS 14 is mounted is predicted as described in a co-pending U.S. patent application entitled AUTOMOTIVE FORWARD LOOKING SENSOR ARCHITECTURE, filed on Nov. 21, 1997 and incorporated herein by reference in its entirety. In subsequent step 292, one of the tracked targets is designated as the primary, or lead target based on predetermined criteria. In the illustrative embodiment, the primary target is defined as the target having the closest range and being disposed within the same lane as the vehicle on which the FLS is mounted. If none of the tracked targets meet this criteria, then there is no primary target and the vehicle maintains the set cruise control speed.

In subsequent step 294, the tracked field of view is reduced as a function of the location of the primary target and the reduced view data is edited. In step 296, the primary target is tracked within this reduced field of view. The reduced view processing of steps 294 and 296 advantageously permits the FLS 14 to more efficiently and frequently monitor the progress of the primary target while monitoring the progress of other tracked targets more infrequently.

In step 298, the FLS 14 provides the range, range rate and azimuth output signals to the controller 26. It will be appreciated that because the signal processing performed by the TRT system 20 introduces an artificial time delay into receipt of the processed signal by the FLS 14, a bias may be introduced into the processing by the FLS 14 to accommodate the delay or to simulate other objects moving relative to the FLS 14. This information may be used by the longitudinal control unit of the vehicle to control aspects of the vehicle operation, such as braking, and may be displayed to the driver in various forms, such as is shown in FIG. 10. Thereafter, the process may be repeated starting at step 280, as shown, or may be terminated.

Referring to FIG. 10, an illustrative scene 179 to be simulated by the test antenna array 40 is shown. The scene includes an overpass 180, a sign 184, trees 182, several other vehicles 186*a*–186*n* and a guard rail 188. The primary target (i.e., the closest object within the same lane as the automobile on which the FLS is mounted) is another automobile labeled 190.

Also shown in FIG. 10 is a graphical representation 194 of the field of view of the FLS 14. Features of the graphical representation 194 include an icon 196 representing the vehicle on which the FLS is mounted and are icons 199*a*–199*c* representing vehicles 186*a*, 190 and 186*n*, respectively. The icon 199*b* representing the primary target vehicle 190 is different from the other icons thereby providing an indication as to its status as primary target. As one example, the primary target icon 199*b* may be distinguished from other targets with color. The direction of the triangular icons may be used to indicate that the rate of the target is increasing or decreasing relative to the rate of the vehicle on which the FLS is mounted.

In actual operation, FLS 14 transmits one or more signals within its field of view (FOV). The transmitted signals intercept objects within the FLS FOV, such as overpass 180, sign 184, vehicles 186*a*–186*n*, road side clutter such as trees 182, guide rail 188 and bridge abutments 192. Each of the signals reflected by the objects 180–192 provides a return signal to the FLS. The FLS 14 receives the return signals and processes the signals in accordance with processing techniques implemented in DSP 250 as described herein and in the U.S. Pat. No. 6,011,507 entitled RADAR SYSTEM AND METHOD OF OPERATING SAME, filed on Nov. 12, 1996 and incorporated herein by reference in its entirety.

Figure 11:
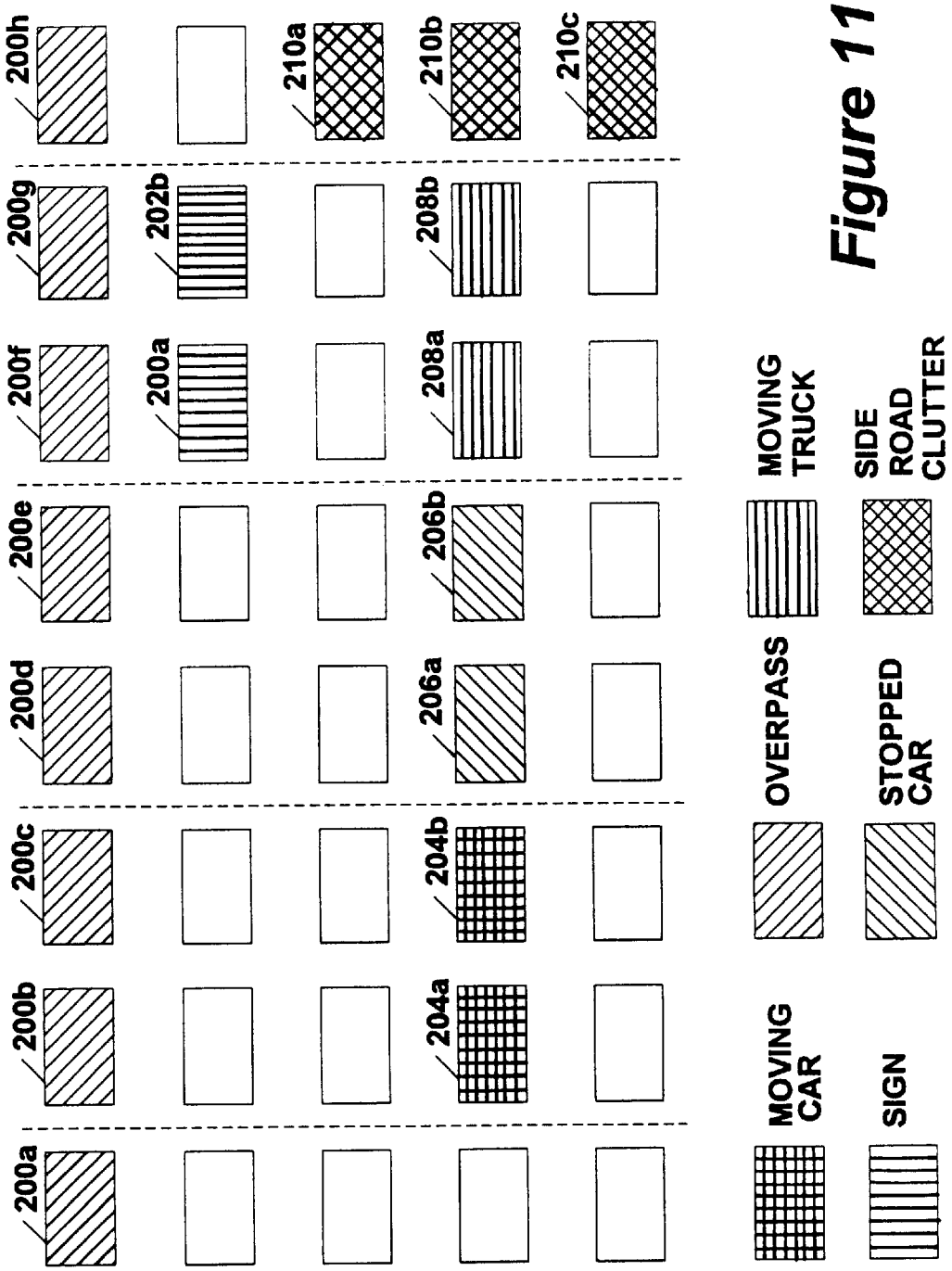
FIG. 11 illustrates excitation of the antenna array of FIG. 4 in simulating the scene of FIG. 10.

Referring to FIG. 11, a suitable pattern of excitation of the antenna array 40 in order to simulate the scene of FIG. 10 is shown. The electromagnetic reflections and radar cross-sections provided by various roadway objects are measured and recorded on a storage media (e.g., magnetic tape, magnetic disk, optical disk, etc. . . . ). Such information is publicly available from various sources, such as in an article entitled "Automotive Anticollision Radar" by Takimoto et al. published in Applied Microwave in the Fall of 1992. As examples, overpasses and signs provide a predetermined Doppler and radar cross-section (RCS) return, road side clutter is characterized by Doppler returns which appear in multiple FFT bins with fluctuating RCS, a stationary vehicle provides a predetermined Doppler return of approximately one square-meter size, a truck moving at a velocity of about 40 mph provides a relatively large RCS (e.g. on the order of 1000 square-meters) and a predetermined Doppler return and reflections from a car moving at a velocity of about 60 mph have a relatively small RCS (e.g. on the order of one square-meter). Each such reflection source is indicated by a different cross-hatching in FIG. 11. Thus, various objects may be modeled by exciting various antenna elements in array 40.

Various predetermined scenes are modeled to collect data indicating the particular ones of the antenna elements of antenna array 40 which must be excited to simulate the scene. Also, the signal processing necessary (in terms of any frequency shift and/or amplitude adjustment) is stored in processor 250 in association with a yaw rate and a velocity, corresponding to the yaw rate and velocity of the FLS 14 when viewing the displayed scene (i.e., the yaw rate and velocity of a vehicle on which the FLS is mounted if the simulated scene were actually encountered by the FLS). In this manner, a scene may be mapped into an excitation pattern on the array 40.

In operation, when it is desired to simulate a particular scene, the corresponding yaw rate signal and velocity signal are provided by the test station controller 26 to the FLS 14. The FLS 14 then transmits a signal which is received by the array 40. The test station controller 26 provides control and data signals to the TRT system 20 indicating how to process the received signal and which antenna elements should re-transmit the processed signal to properly simulate the particular scene. It should be noted that the signal retransmitted by each antenna element may be processed differently.

As shown in FIG. 11, to simulate an overpass, antenna elements 200*a*–200*h* are excited with a predetermined amplitude and frequency. Thus, the signal received by FLS 14 has characteristics similar to the characteristics which the FLS 14 would receive from signals reflected off of an actual overpass.

Similarly, antenna elements 202*a*, 202*b* are excited with an amplitude and frequency corresponding to the amplitude and frequency of signals reflected from a sign and detected by the FLS. Likewise, antenna elements 204*a*–204*b*, 206*a*–206*b*, 208*a*–208*b* and 210*a*–210*c* are excited with amplitudes and frequencies which simulate, respectively, a moving car, a stopped car, a moving truck and roadside clutter.

The FLS 14 receives the processed signal transmitted by the TRT system 20 and uses the yaw rate and velocity information in processing the received signal in order to provide the range, range rate and azimuth of the primary target to the vehicle in accordance with the process of FIG. 9. It will be appreciated by those of ordinary skill in the art, that the particular scene modeled on the array 40 in FIG. 11 is one of a multitude of possible scenes that can be readily modeled and used to test the performance of the FLS 14.

Figure 12:
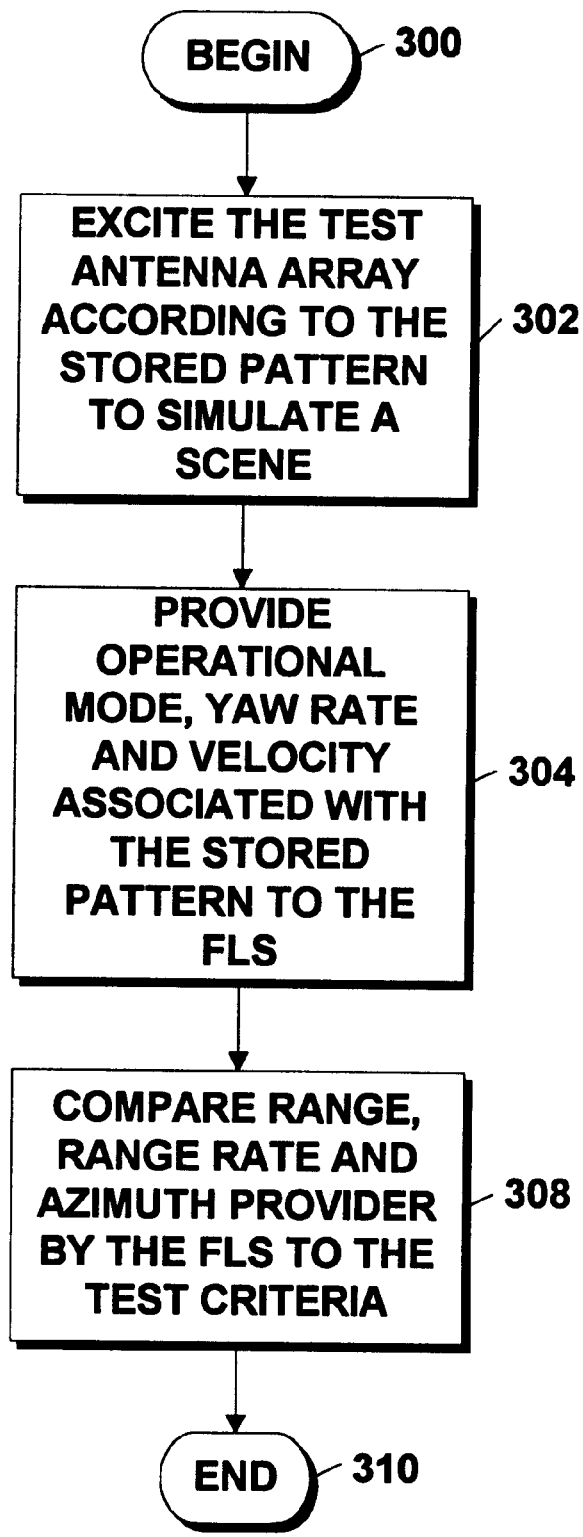
FIG. 12 is a flow diagram illustrating a method of testing the performance of an automotive FLS with the test station of FIG. 1.

Referring to FIG. 12, a method of testing an FLS 14 in the test station 10 commences in step 300, following which the test antenna array 40 is excited according to a stored pattern to simulate a predetermined scene within the field of view of the FLS in step 302. In step 304, certain information associated with the simulated scene is provided to the FLS 14 by the controller 26. This information includes yaw rate and velocity of the FLS 14 relative to the scene and may additionally include an operational mode of the FLS 14, such as acquisition or track.

In step 308, the range, range rate and azimuth output signals generated by the FLS 14 in response to receipt of signals processed by the test antenna array 40 are compared to certain test criteria. The test criteria is a function of range, range rate and azimuth associated with the primary target within the predetermined scene and stored in association with the antenna array pattern with which the array 40 is excited. In general, the test criteria is set equal to the stored range, range rate and azimuth plus and minus some predetermined tolerance. The comparison of step 308 provides a determination of the performance of the FLS 14, following which the process terminates in step 310.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A test station for testing a radar system, the test station comprising:
   a test chamber having a first end at which the radar system is disposed and a second end; and
   a transmit/receive test (TRT) system disposed at the second end of the test chamber and operative to receive an RF signal transmitted by the radar system, process the received signal to simulate a predetermined scene by modeling a predetermined object within the scene based on at least one known parameter of a radar return associated with said predetermined object and transmit the processed signal toward the radar system.

2. The test station of claim 1 wherein said TRT system comprises:
   an antenna array adapted to receive an RF signal having a predetermined frequency within a range of frequencies; and
   a transmit/receive radio frequency (TR RF) processor coupled to said antenna array, said TR RF processor for processing RF signals received by said antenna array and for providing the processed signals to said antenna array for transmission to the radar system.

3. The test station of claim 2 wherein said test chamber provides predetermined transmission and absorption characteristics to electromagnetic energy having a frequency on the order of 77 GHz propagating therein.

4. The test station of claim 1 wherein the TRT system comprises:
   a plurality of antenna elements, each adapted to receive an RF signal transmitted through the test chamber by the radar system; and
   a transmit/receive radio frequency (TR RF) processor coupled to at least one antenna element, said TR RF processor for processing the RF signal received by the at least one antenna element by a selected one of: shifting the frequency of the received RF signal and adjusting the amplitude of the received RF signal and for transmitting the processed signal toward the radar system.

5. The test station of claim 4 wherein said TR RF processor comprises:
   a frequency synthesizer for providing a local oscillator signal;
   a single-sideband generator (SSBG) coupled to said frequency synthesizer, said SSBG responsive to the received RF signal and to the local oscillator signal for selectively shifting the frequency of the received RF signal in accordance with the local oscillator signal and for suppressing a sideband of the received RF signal to provide a single-sideband signal; and
   an amplitude adjustment element responsive to the single-sideband signal for selectively adjusting the amplitude of the single-sideband signal to provide the processed signal.

6. The test station of claim 5 wherein said TR RF processor further comprises a circulator having first, second and third ports with the first port coupled to the at least one antenna element and the second port coupled to an input to the SSBG to provide a first relatively low loss signal path between the at least one antenna element and the input of the SSBG and wherein the third port of said circulator is coupled to an output of the SSBG to provide a second relatively low loss signal path between the output of the SSBG and the at least one antenna element and wherein said circulator provides a relatively high isolation characteristic between said first and second signal paths.

7. The test station of claim 4 wherein said TR RF processor comprises a plurality of TR RF process modules, each one associated with a corresponding one of the plurality of antenna elements for processing the RF signal received by the corresponding antenna element.

8. The test station of claim 4 further comprising a controller for providing control signals to the radar system and to the TRT system.

9. The test station of claim 8 wherein the control signals provided by the controller to the TRT system are selected from a signal indicative of a frequency shift and a signal indicative of an amplitude adjustment for the received RF signal.

10. The test station of claim 8 wherein the control signals provided by the controller to the radar system include a yaw rate signal and a velocity signal associated with the radar system relative to the predetermined scene.

11. The test station of claim 8 wherein the controller further comprises a data recorder for recording an output signal provided by the radar system in response the processed signal.

12. The test station of claim 11 wherein the output signal provided by the radar system is one of a range signal indicative of a range associated with a primary target in the predetermined scene, a range rate signal indicative of a range rate associated with the primary target in the predetermined scene and an azimuth signal indicative of an azimuth associated with the primary target in the predetermined scene.

13. A method for testing the performance of a radar system, comprising the steps of:
   providing a test chamber having a first end at which the radar system is disposed and a second end;
   providing a test antenna at the second end of the test chamber;
   receiving at the test antenna array an RF signal transmitted by the radar system through the test chamber;
   processing the received signal with a transmit/receive (TR) processor in order to simulate a predetermined scene in the field of view of the radar system;
   transmitting the processed signal through the test chamber to the radar system; and
   providing control signals to the radar system, said control signals being indicative of movement of the radar system relative to the predetermined scene.

14. The method of claim 13 wherein the processing step includes processing the received signal by selectively shifting the frequency of the received signal and adjusting the amplitude of the received signal.

15. The method of claim 14 wherein the step of transmitting the processed signal includes the step of transmitting the frequency-shifted, amplitude-adjusted signal to the radar system.

16. The method of claim 13 wherein the test chamber providing step further includes the step of designing the chamber to provide predetermined absorption and transmission characteristics to electromagnetic energy having a frequency on the order of 77 GHz.

17. The method of claim 13 wherein:
the test antenna array providing step includes the step of providing a plurality of antenna elements, each adapted to receive an RF signal transmitted by the radar system; and
the received signal processing step includes the step of processing the RF signals received by the plurality of antenna elements.

18. The method of claim 13 wherein the control signal providing step comprises the step of providing control signals to the radar system indicative of a yaw rate and a velocity associated with the radar system relative to the predetermined scene.

19. The method of claim 13 further comprising the step of comparing an output signal provided by the radar system in response to the processed signal with predetermined test criteria in order to assess the performance of the radar system.

20. The method of claim 19 wherein the output signal provided by the radar system is one of a range signal indicative of a range associated with a primary target in the predetermined scene, a range rate signal indicative of a range rate associated with the primary target in the predetermined scene and an azimuth signal indicative of an azimuth associated with the primary target in the predetermined scene.

21. A test station comprising:
(a) a test chamber having a first end and a second end; and
(b) a transmit/receive test (TRT) system disposed at the second end of said test chamber, said TRT system including:
(1) means, comprising a plurality of antenna elements, for receiving RF signals emanating from the first end of said test chamber;
(2) means, coupled to said means for receiving RF signals, for processing the received RF signals to simulate a predetermined scene having a plurality of objects; and
(3) means, coupled to said means for processing received RF signals, for receiving the processed RF signals and for transmitting the processed RF signals from the second end of said test chamber to the first end of said test chamber to simulate said scene having a plurality of objects.

22. The test station of claim 21 wherein said means for processing the received RF signals to simulate a predetermined scene comprises:
means for shifting the frequency of the received RF signals; and
means for adjusting the amplitude of the received RF signals.

23. The test station of claim 22 wherein said means for shifting the frequency of the received RF signal comprises:
a frequency synthesizer; and
a single-sideband generator (SSBG) coupled to at least one of said plurality of antenna elements and to said frequency synthesizer, said SSBG for receiving RF signals fed thereto from each of said at least one antenna element and for shifting the frequency of said received RF signal by an amount corresponding to a frequency difference between the frequency of the RF signals received from said at least one antenna element and a frequency of a signal provided by said frequency synthesizer.

24. The test station of claim 21 wherein the means for receiving the processed RF signal and for transmitting the processed RF signals from the second end of said test chamber to the first end of said test chamber comprises a plurality of antenna elements.

25. A test station for testing a radar system, the test station comprising:
a test chamber having a first end at which the radar system is disposed and a second end;
a transmit/receive test (TRT) system disposed at the second end of the test chamber and operative to receive an RF signal transmitted by the radar system, process the received signal to simulate a predetermined scene and transmit the processed signal toward the radar system; and
a controller for providing control signals to the TRT system indicative of the processing of the received signal by the TRT system to simulate the predetermined scene and for providing control signals to the radar system indicative of a predetermined movement of said radar system relative to said TRT system.

26. The test station of claim 25 wherein said control signals provided by said controller to said radar system are selected from a yaw rate signal and a velocity signal.

27. The test station of claim 1 wherein said test chamber has an RF transparent window disposed through a wall at said first end, behind which said radar system is disposed.

28. The test station of claim 1 wherein said test chamber has an aperture at said first end and said radar system is disposed adjacent to said aperture.

29. The test station of claim 1 wherein the known parameters of the modeled object are selected from the group consisting of electromagnetic reflection and radar cross-section.

30. A test station comprising:
(a) a test chamber having a first end and a second end; and
(b) a transmit/receive test (TRT) system, disposed at the second end of said test chamber, to simulate a predetermined scene having a plurality of objects, said TRT system comprising:
(1) a plurality of antenna elements disposed to receive RF signals emanating from the first end of said test chamber;
(2) a plurality of transmit/receive RF processors, at least one of the plurality of transmit/receive RF processors simulating an object within the scene and at least another one of the plurality of transmit/receive RF processors simulating a different object within the scene.

31. The test station as recited in claim 30 wherein the at least one of the plurality of transmit/receive RF processors comprises:
(i) a single-sideband generator, having a first and second input and an output, said first input selectively coupled to at least one of the plurality of antenna elements and said output selectively coupled to at least one the plurality of antenna elements; and
(ii) a frequency synthesizer, responsive to a control signal, having an output coupled to the second input of the single-sideband generator to modify an RF signal fed into the single-sideband generator to simulate a particular Doppler and/or range offset of one of the plurality objects within the scene.

* * * * *